Patented Jan. 14, 1936

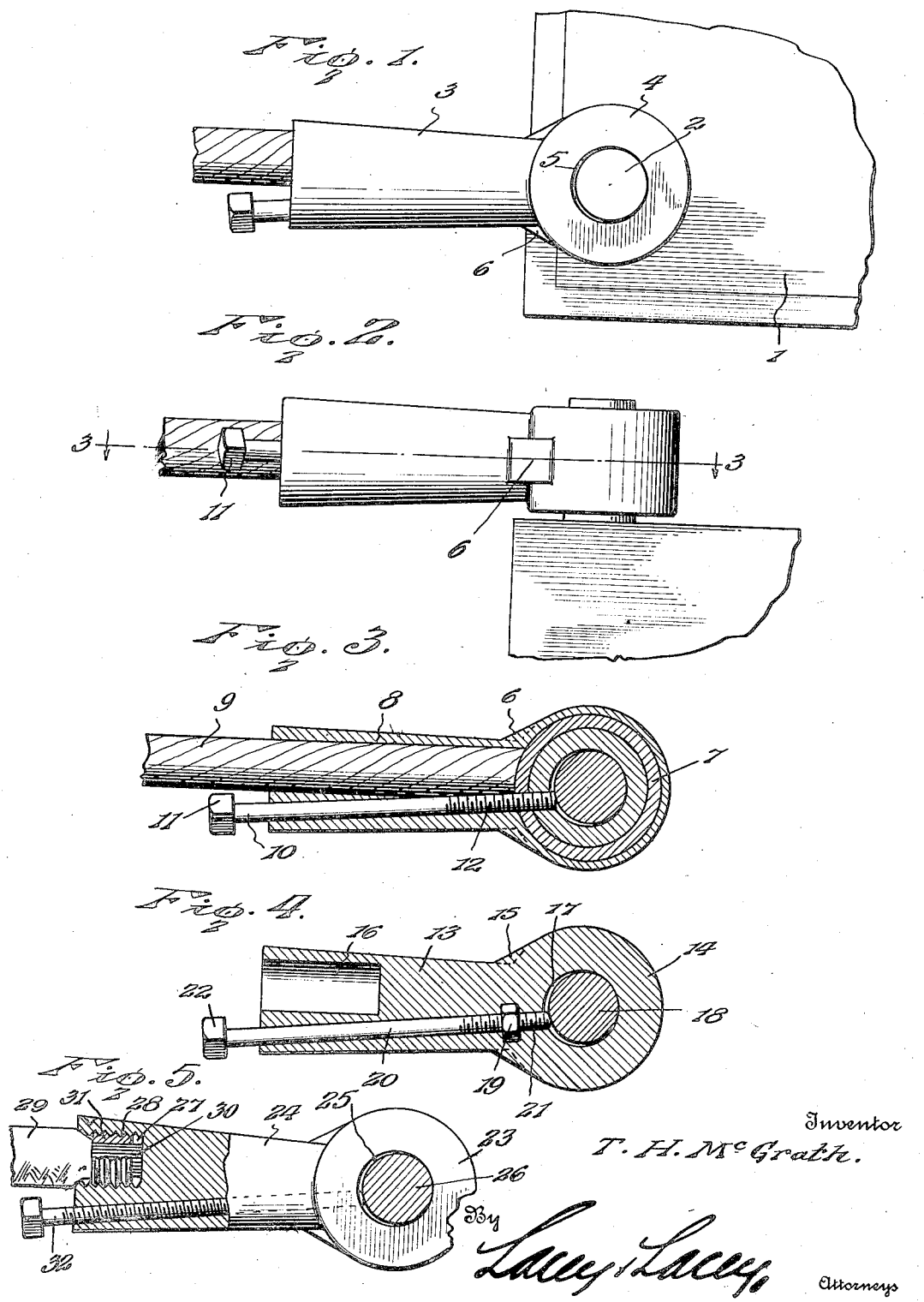

2,027,646

UNITED STATES PATENT OFFICE 2,027,646

BATTERY TERMINAL

Thomas H. McGrath, Detroit, Mich.

Application January 25, 1934, Serial No. 708,297

3 Claims. (Cl. 173—259)

This invention relates to an improved battery terminal.

One object of the invention is to provide a battery terminal which is of such construction that a battery cable may be effectually connected with a battery post in such manner that the cable will be protected against corrosion occurring at the post.

Another object of the invention is to provide a battery terminal which may be installed upon the battery post and removed therefrom with the greatest facility and which, when installed, will effect a positive electrical connection between the battery post and battery cable.

The invention seeks as a further object the provision of a device of this character which, in itself, will not be susceptible to chemical reaction occurring at the battery post.

And the invention seeks as a still further object the provision of a battery terminal which may be manufactured cheaply in large quantities to retail at a small figure.

Other and incidental objects of the invention not specifically pointed out hereinabove will render themselves apparent during the course of the following description.

My invention is illustrated in the accompanying drawing, wherein:

Figure 1 is a top plan view of a battery terminal constructed in accordance with my invention installed on a battery post.

Figure 2 is a side elevation of my improved battery terminal installed in proper position.

Figure 3 is a horizontal sectional view of my device on the line 3—3 of Figure 2, looking in the direction indicated by the arrows.

Figure 4 is a horizontal sectional view showing a slightly modified form of my invention.

Figure 5 is a top plan view, partly broken away, and shown in section, of a still further modification of my invention.

Referring now more particularly to the drawing, the numeral 1 indicates a portion of a storage battery which is provided with a battery post 2. My improved battery terminal consists of a body portion 3 which is preferably formed from relatively soft metal and gradually enlarged in diameter toward its outer end. Formed integral with the body is a circular head 4 having an opening 5 therein. Providing reinforcement for the joint between the head 4 and the body 3 are webs 6. The head, body and webs are preferably molded integral from a composition comprising lead and antimony. This composition is substantially the same as is employed in the manufacture of the usual battery posts and is not susceptible to corrosion caused by chemical reactions taking place within the storage battery. Molded within the head 4 concentrically thereof is an anchoring ring 7 which is preferably formed of steel. The ring is located substantially medially of the head so that it will not come in contact with the battery post and become corroded thereby. As best seen in Figure 3 of the drawing, the body 3 is provided throughout its length with a relatively large opening or socket 8 which is adapted to receive the skinned end portion 9 of a battery cable therein. Removably mounted in the body and extending longitudinally thereof in inclined relation to the socket 8 is a locking bolt 10 having a squared or hexagonal head 11 thereon. As shown at 12, the bolt is threaded and said bolt is screwed through alined openings formed in the ring and the head 4 to extend into the opening 5 in the head. As will be observed, the threaded portion of the bolt 12 extends into the socket 8 and contacts with the skinned end portion 9 of the cable so that the bolt will provide retaining means for the skinned end of the cable and prevent accidental displacement thereof from the terminal.

In use, the device is placed over the battery post 2 and the bolt 10 is tightened by engaging a pair of pliers or a wrench with the squared head 11 and rotating said bolt for engaging the end portion thereof extending into the opening 5 with the battery post and providing a tight connection. Attention is directed to the fact that the ring 7 serves not only to provide a support for the inner end of the bolt but this ring also serves to reinforce the entire head so that mutilation thereof will be reduced to a minimum.

When it is desired to remove the device from the battery post it is only necessary to rotate the bolt in a counter-clockwise direction for retracting the inner end thereof from the post 2, when the entire device may be readily lifted from the post. The webs 6 will tend to prevent fracture of the device which might take place at the joint between the head and the body of the device.

Referring now more particularly to the modification of my invention as shown in Figure 4 of the drawing, I employ a body 13 having a head 14 cast integral therewith. Webs 15 provide reinforcement for the joint between the head and the body, as in the preferred form. Formed in the end of the body 3 and extending substantially half of its length, is a socket 16 which is adapted to receive the skinned end portion of a battery cable. The head 14 is provided with a circular concentrically located opening 17 which is of sufficient diameter to receive a battery post, as shown at 18. Embedded in the head 14 at its junction with the body 13, near one of the webs 15, is a nut 19, and screwed through the body longitudinally thereof in inclined relation to the socket 16 is a bolt 20, the inner end of which is threaded, as shown at 21, and screwed through the nut 19 into the opening 17 for engagement with the battery post 18. The bolt is provided at its outer end with a squared head 22 which is adapted to be engaged by a pair of pliers, wrench, or the like. It will be understood that the nut 19 will serve to provide anchoring and guiding means for the inner end of the bolt so that slipping of the threads 21, which might take place in the relatively soft metal of the body and head, will be prevented. The operation of the device is identical with that of the preferred form.

Referring now to the modification of my invention, as shown in Figure 5 of the drawing, I provide a head 23 which is cast integral with a body 24. The head is provided with a circular opening 25 which is adapted to receive a battery post 26 therein. Formed in the free end of the body is a socket 27 which extends throughout substantially half the length of the body. The socket is provided with an enlarged slightly tapered internally threaded portion 28 at its outer end. Normally associated with the threaded portion 28 is a battery cable 29, which is provided with a skinned end 30. Tightly fitted about the skinned end 30 is a threaded sleeve 31 which is adapted to screw into the threaded portion 28. The sleeve 31 may be secured on the end 30 by means of a wedge or the like which is driven into the end 30 for spreading the same. The outer end portion of the threaded portion 28 of the body is punched, as shown at 32, for locking the cable 29, end 30, and sleeve 31 rigidly so that a good connection will be provided. A bolt 32 extends longitudinally of the body and has its inner end terminating within the opening 25, as in the preferred form of the invention, and is adapted for engagement with the post 26 for tightly but removably clamping the device upon the post. Aside from the employment of the sleeve or nipple, the device is identical with the first mentioned modification and operates in the same manner as does the preferred form and said first mentioned modification.

Having thus described the invention, what I claim is:

1. A device of the class described including an elongated body of relatively soft metal having a head at one end formed with an opening adapted to receive a battery post, a ring of relatively hard metal embedded in the head concentrically thereof and reinforcing the head, said body being formed with a longitudinally extending socket to receive a battery cable, and a bolt extending longitudinally through the body at one side of the socket and through the ring and head into the post receiving opening of the head, said bolt having a portion projecting into the socket for clamping engagement with a cable to hold the cable in the socket, means being provided to adjustably mount the bolt for longitudinal movement to shift its inner end into and out of abutting engagement with the post whereby the device may be removably clamped about the post.

2. A device of the class described including an elongated body of relatively soft metal having a head formed with an opening of a diameter to receive a battery post, said body being formed with a cable receiving socket extending longitudinally thereof, a ring of relatively hard metal embedded in the head concentrically thereof, a bolt extending longitudinally in the body and for a portion of its length extending through a portion of the socket for engaging a battery cable in the socket and exerting wedging grip thereon, said bolt having its inner end portion threaded and engaged through alined threaded openings formed in the ring and the head for abutting engagement with the battery post whereby the device may be clamped about the post, said bolt being shiftable when turned in one direction for freeing the device from the post.

3. A device of the class described including an elongated body of relatively soft metal having a head provided with an opening adapted to receive a battery post, reinforcing means of relatively hard metal carried within the head about the opening thereof, said body being formed with a longitudinally extending socket to receive a battery cable, and a bolt extending longitudinally of the body at one side of the cable receiving socket with its inner end portion threaded through the reinforcement and head and extending into the opening of the head for engagement with the post whereby the device may be removably clamped about the post when the bolt is tightened, said bolt for a portion of its length projecting into the socket for applying transverse pressure to a cable in the socket and exerting wedging grip to hold the cable in the socket.

THOMAS H. McGRATH.